(12) United States Patent
Kim et al.

(10) Patent No.: US 9,860,834 B2
(45) Date of Patent: Jan. 2, 2018

(54) METHOD FOR RESELECTING NETWORK NODE IN CHARGE OF CONTROL PLANE

(71) Applicant: LG ELECTRONICS INC., Seoul (KR)

(72) Inventors: Taehun Kim, Seoul (KR); Jaehyun Kim, Seoul (KR); Jinsook Ryu, Seoul (KR); Taehyeon Kim, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 14/915,489

(22) PCT Filed: Sep. 5, 2014

(86) PCT No.: PCT/KR2014/008365
§ 371 (c)(1),
(2) Date: Feb. 29, 2016

(87) PCT Pub. No.: WO2015/037882
PCT Pub. Date: Mar. 19, 2015

(65) Prior Publication Data
US 2016/0219503 A1 Jul. 28, 2016

Related U.S. Application Data

(60) Provisional application No. 61/877,302, filed on Sep. 13, 2013, provisional application No. 61/941,987, filed on Feb. 19, 2014.

(51) Int. Cl.
*H04W 28/00* (2009.01)
*H04W 48/20* (2009.01)
*H04W 8/06* (2009.01)

(52) U.S. Cl.
CPC ........... *H04W 48/20* (2013.01); *H04W 8/065* (2013.01)

(58) Field of Classification Search
CPC .............................. H04W 48/20; H04W 8/065
See application file for complete search history.

(56) References Cited

U.S. PATENT DOCUMENTS

2010/0099402 A1* 4/2010 Wu ...................... H04W 76/027
455/423
2010/0220656 A1 9/2010 Ramankutty et al.
(Continued)

FOREIGN PATENT DOCUMENTS

KR 10-2011-0020166 A 3/2011

*Primary Examiner* — Jay P Patel
(74) *Attorney, Agent, or Firm* — Birch, Stewart, Kolasch & Birch, LLP

(57) ABSTRACT

One embodiment of the present specification provides a method by which a user equipment (UE) reselects a network node in charge of a control plane. The method can comprise the steps of: retransmitting, by the UE, a non-access stratum (NAS) request message if the UE transmitted the NAS request message to a network node in charge of the control plane through a base station but has not received a response message; transmitting, by the UE, an access stratum (AS) message, which includes an indication showing no response from the network node, to the base station if the retransmission of the NAS request message has repeated by a preset value or more; and reselecting another network node in charge of the control plane instead of the network node in a disabled state if information indicating that the network node is in the disabled state is received from the base station.

15 Claims, 15 Drawing Sheets

(56) References Cited

U.S. PATENT DOCUMENTS

| | | | |
|---|---|---|---|
| 2011/0045826 A1 | 2/2011 | Kim et al. | |
| 2011/0235505 A1 | 9/2011 | Eswara et al. | |
| 2012/0302230 A1* | 11/2012 | Lim | H04W 76/021 |
| | | | 455/422.1 |
| 2014/0016614 A1* | 1/2014 | Velev | H04W 4/005 |
| | | | 370/331 |
| 2014/0032383 A1* | 1/2014 | Wang | H04L 12/1403 |
| | | | 705/32 |

* cited by examiner

METHOD FOR RESELECTING NETWORK NODE IN CHARGE OF CONTROL PLANE

CROSS REFERENCE TO RELATED APPLICATIONS

This application is the National Phase of PCT International Application No. PCT/KR2014/008365, filed on Sep. 5, 2014, which claims priority under 35 U.S.C. 119(e) to U.S. Provisional Application Nos. 61/877,302, filed on Sep. 13, 2013 and 61/941,987, filed on Feb. 19, 2014, all of which are hereby expressly incorporated by reference into the present application.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

As illustrated, an evolved UMTS terrestrial radio access network (E-UTRAN) is connected to an evolved packet core (EPC). The E-UTRAN is a radio access network defined after 3GPP release-8, and is also called a 4th generation (4G) (i.e., LTE) network. A radio access network before the LTE, i.e., a 3rd generation (3G) radio access network, is a UTRAN.

The E-UTRAN includes a base station (BS) (or eNodeB) 20 which provides a control plane and a user plane to a user equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6 exemplarily illustrates a network inability state.

As illustrated in FIG. 6, numerous UEs 10a, 10b, 10c, and 10d are present in the coverage of the eNodeB 20 and attempt data transmission and reception. As a result, when the eNodeB 20 is congested, downlink data from the eNodeB 20 to the UEs or uplink data from the UEs to the eNodeB 20 are not normally transmitted but unsuccessfully transmitted.

In this case, when uplink data from specific UE 10a is a control signal toward the MME 51, for example, an attach request, a tracking area update (TAU) request, a routing area update (RAU) request, or a service request, the UE 10a experiences service interruption.

Similarly, when the MME 51 is in an inability state due to congestion, and the like, the control signal from the specific UE 10a, for example, the attach request, the tracking area update (TAU) request, the routing area update (RAU) request, or the service request may not normally be transferred to the MME 51, and as a result, the UE 10a experiences service interruption.

SUMMARY OF THE INVENTION

Accordingly, one disclosure of the specification has been made in an effort to provide a scheme that solves the problem.

In order to achieve the aforementioned object, one disclosure of the specification provides a method of a user equipment (UE) reselecting a network node in charge of a control plane. The method may comprise: retransmitting, by the UE, a non-access stratum (NAS) request message when the UE transmits the NAS request message to a network node in charge of the control plane through a base station but receives no response message; transmitting, by the UE, an access stratum (AS) message, which includes an indication showing no response from the network node, to the base station when retransmission of the NAS request message is repeated a preset number of times or more; and reselecting another network node in charge of the control plane instead of the network node in a disabled state when information indicating that the network node is in the disabled state is received from the base station.

The network node in charge of the control plane may be a mobility management entity (MME) or serving general packet radio service support node (SGSN).

The NAS request message may comprise at least one of an attach request message, a tracking area update (TAU) request message, a routing area update (RAU) request message, a location are update (LAU) request message and a service request message.

The method may further comprise: transmitting a TAU request message or RAU request message to the selected other node.

When the TAU request message is transmitted, the TAU request message does not comprise at least one of an SAE-temporary mobile subscriber identity (S-TMSI) and an ID of the MME, and when the RAU request message is transmitted, the RAU request message may comprise no packet-temporary mobile subscriber identity (P-TMSI).

The information indicating that the network node is in the disabled state may be broadcast from the base station. The information indicating that the network node is in the disabled state may be received via system information broadcast from the base station.

The method may further comprise: receiving information indicating that the network node is recovered from the base station in a broadcast manner when the network node is recovered from the disabled state to a normal state.

In order to achieve the aforementioned object, one disclosure of the specification provides a method of a base station reselecting a network node in charge of a control plan. The method may comprise: receiving an access stratum (AS) message, which includes an indication showing no response from the network node, from a user equipment (UE) retransmitting a non-access stratum (NAS) request message a number of times; transmitting a state identification request message to the network node in response to the received message; notifying another base station or the UE that the network node is in a disabled state when a response message to the state identification request message is not received; and reselecting another network node in charge of the control plane for the UE.

The notifying the UE that the network node is in the disabled state may include broadcasting system information which comprises information indicating that the network node is in the disabled state.

The method may further comprise: broadcasting information indicating that the network node is recovered when the network node is recovered from the disabled state to a normal state.

According to embodiments of the present invention, the foregoing problem of the prior art is solved. Specifically, according to one embodiment of the present invention, when a user equipment (UE) transmits a non-access stratum (NAS) request message (for example, an attach request message/tracking area update (TAU) request message/routing area update (RAU) request message/location area update (LAU) request message/service request) but receives no response due to a disabled mobility management entity (MME)/serving general packet radio service (GPRS) support node (SGSN), unnecessary retransmissions may be prevented. Accordingly, waste of signaling in a network may be avoided and network load may be prevented. Further, user experience may be improved.

DESCRIPTION OF EXEMPLARY EMBODIMENTS

Figure 1:
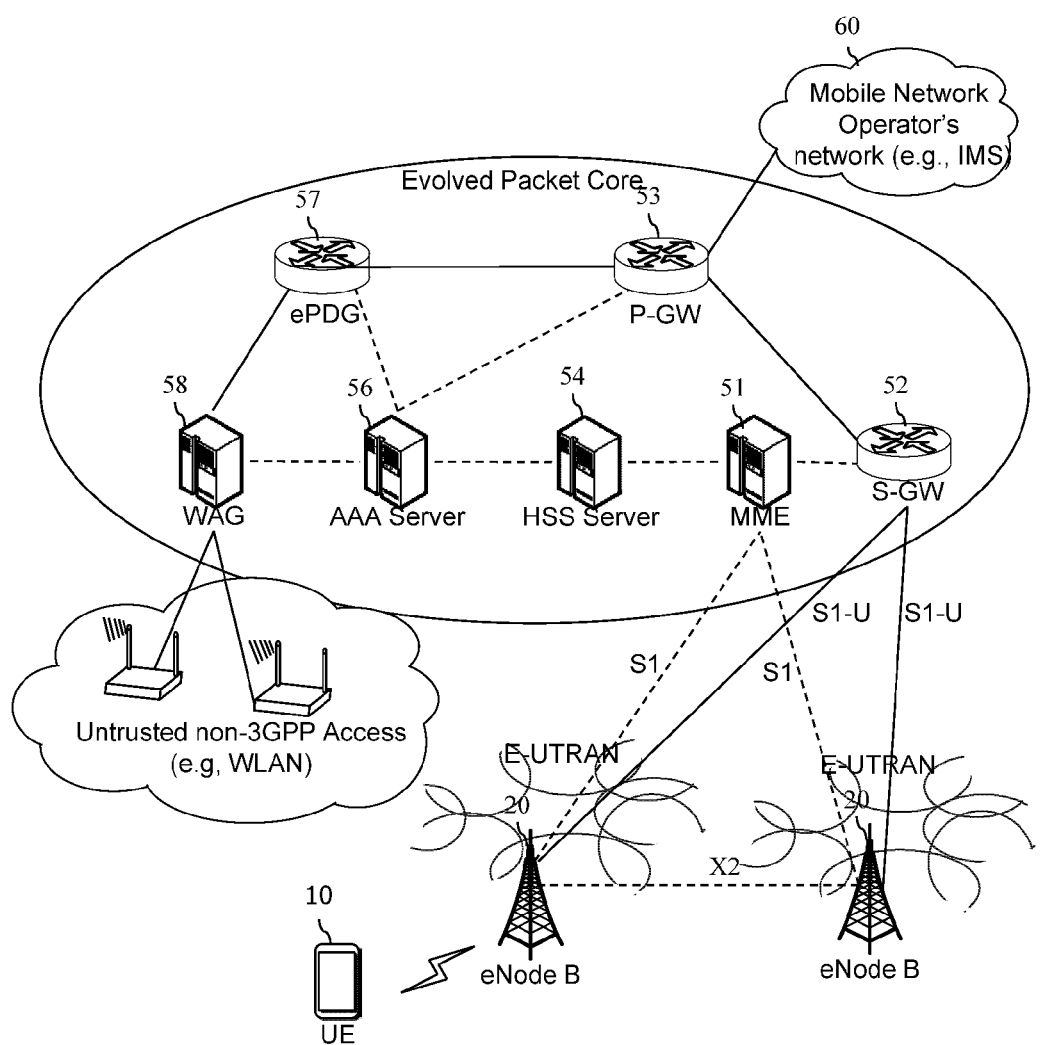
FIG. 1 shows the configuration of an evolved mobile communication network.
Figure 2:
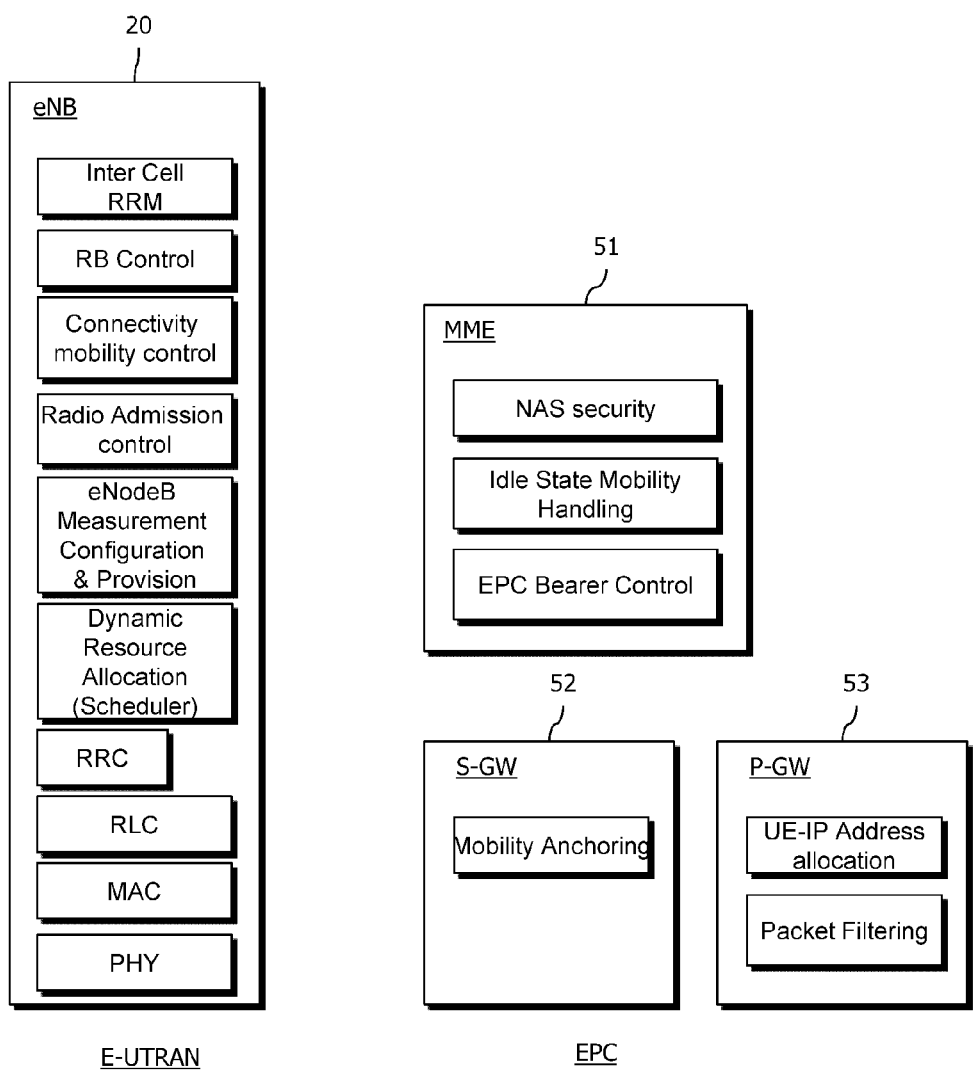
FIG. 2 is an exemplary diagram showing the architecture of a common E-UTRAN and a common EPC.
Figure 3:
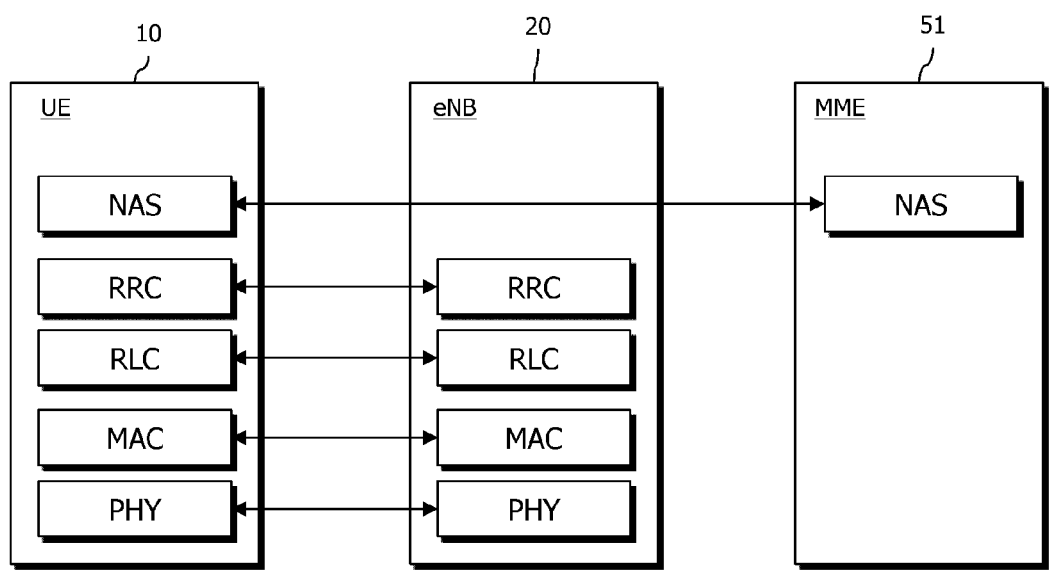
FIG. 3 is an exemplary diagram showing the structure of a radio interface protocol in a control plane between UE and an eNodeB.
Figure 4:
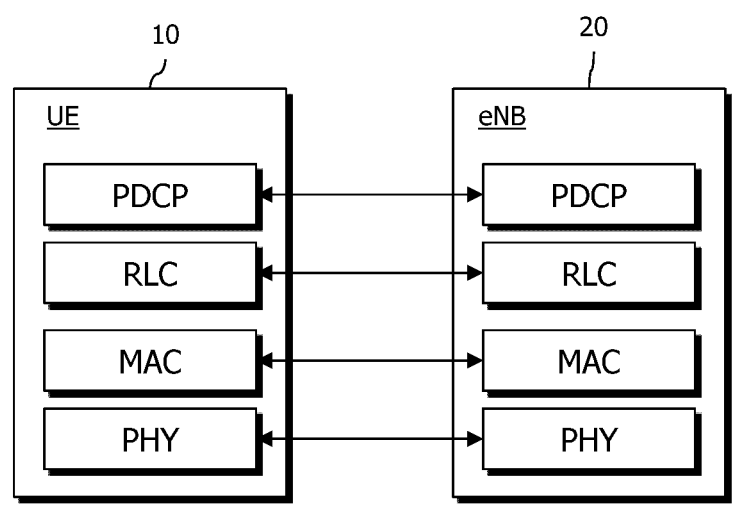
FIG. 4 is another exemplary diagram showing the structure of a radio interface protocol in a user plane between UE and a base station.
Figure 5:
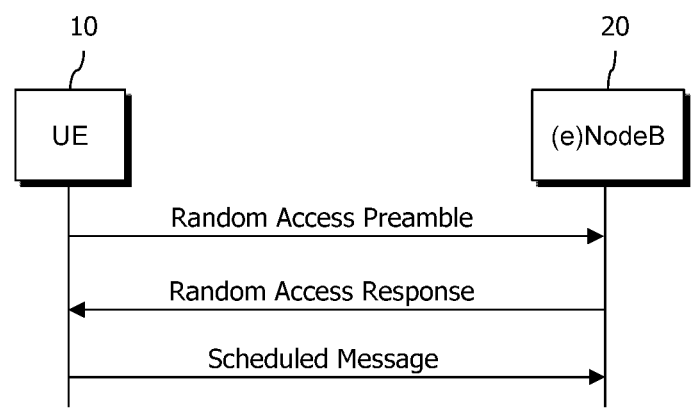
FIG. 5 is a flowchart illustrating a random access process in 3GPP LTE.
Figure 6:
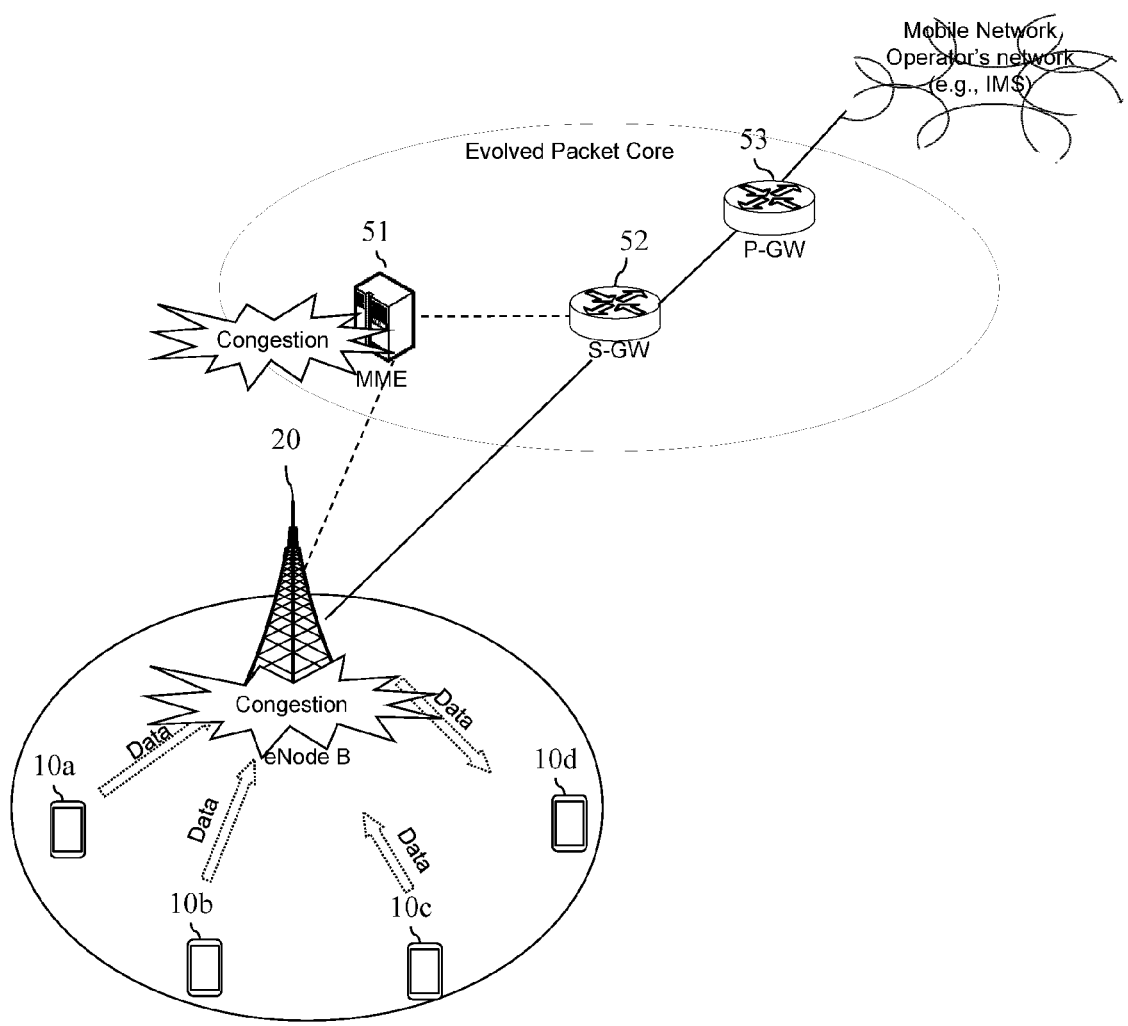
FIG. 6 exemplarily illustrates a network inability state.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

PLMN: as an abbreviation of Public Land Mobile Network, means a network identification number of a mobile communication provider.

UE/MS: User Equipment/Mobile Station.Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

PCRF (Policy and Charging Rule Function): a node of the EPS network which performs policy decision for dynamically applying QoS and charging policy differentiated for each service flow.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): an End point ID of a tunnel configured among nodes in the networks and configured for each section per bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

OMA DM (Open Mobile Alliance Device Management): as a protocol designed to manage mobile devices such as a cellular phone, a PDA, a portable computer, and the like, performs functions including device configuration, firmware upgrade, error report, and the like.

OAM (Operation Administration and Maintenance): means a network management function group providing network failure display, performance information, and data and diagnosis function.

NAS (Non-Access-Stratum): upper stratum of a control plane between a UE and an MME. Supports mobility management, session management, IP address management, etc. between a UE and a network.

NAS configuration MO (Management Object): means a management object (MO) used to configure parameters associated with NAS functionality in UE.

HLR(Home Location Register)/HSS(Home Subscriber Server): database (DB) representing subscriber information on in a 3GPP network.

MM (Mobility Management) operation/procedure: An operation or procedure for control/management/control of mobility of UE. The MM operation/procedure may be interpreted to include at least one of an MM operation/procedure in a CS network, a GMM operation/procedure in a GPRS network, and an EMM operation/procedure in an EPS network. The UE and the network nodes (MME, SGSN, and MSC) send and receive MM messages in order to perform the MM operation/procedure.

SM (Session Management) operation/procedure: An operation or procedure for controlling/managing/processing/handling a user plane and/or bearer context/PDP context of the UE. The SM operation/procedure may be interpreted to include at least one of an SM operation/procedure in the GPRS network and an ESM operation/procedure in the EPS network. The UE and the network nodes (MME and SGSN) send and receive SM messages in order to perform the SM operation/procedure.

Hereinafter, a disclosure of the specification will be described with reference to the drawings.

Figure 7:
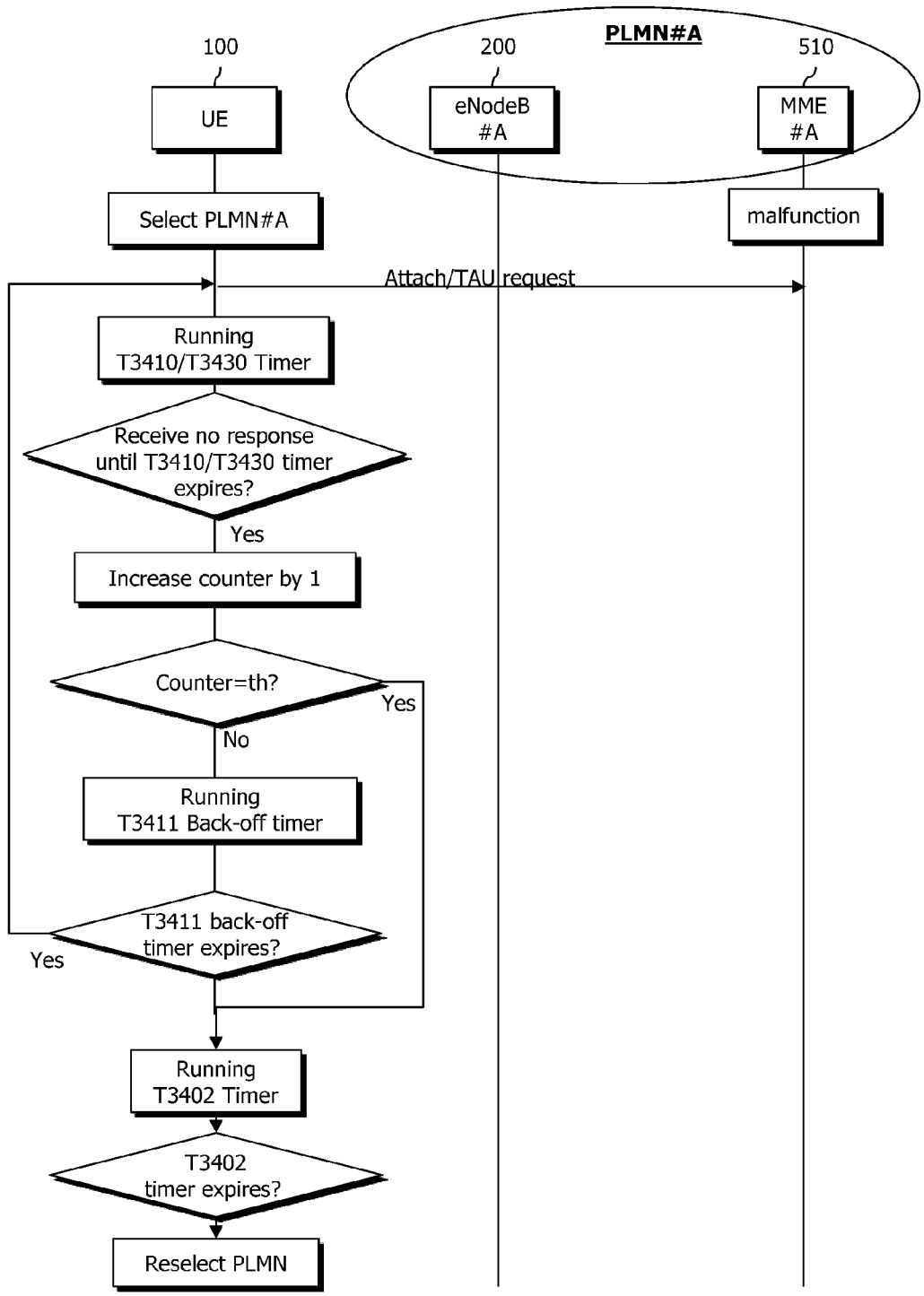
FIG. 7 illustrates a case where an attach request/TAU request continually fails when an MME is disabled.

FIG. 7 illustrates a case where an attach request/tracking area update (TAU) request continually fails when an MME is disabled.

First, selecting a public land mobile network (PLMN) refers to a process in which a UE 100 selects a network (that is, a PLMN) of a subscription mobile communication provider to access the PLMN when turned on.

Before going to a description with reference to FIG. 7, a PLMN selecting process is described below.

The PLMN selecting process is performed as follows. First, when the UE 100 is turned on with a valid universal subscriber identity module (USIM), the UE 100 normally attempts to register to a previously registered PLMN. When registration fails, an NAS layer of the UE 100 starts PLMN selection. When the PLMN selection is started, an AS layer of the UE 100 performs a search for available PLMNs. Here, the UE 100 scans all supportable frequencies in an E-UTRAN band. Available PLMNs found by the AS layer of the UE 100 are reported to the NAS layer. Here, related radio access technology (RAT) information is also reported. The NAS layer of the UE 100 accesses pieces of PLMN information reported by the AS layer and selects a PLMN to register to among the PLMNs. Here, the NAS layer of the UE 100 performs PLMN selection according to priorities of PLMNs/RATs stored in the USIM. PLMN selection is divided in to an automatic PLMN selection mode and a manual PLMN selection mode. The automatic PLMN selection mode allows a UE to automatically select one available PLMN from a priority-based PLMN list. The manual PLMN selection mode allows a user to directly select one PLMN from a list of PLMNs provided by the AS. In the automatic PLMN selection mode, the UE attempts to select and register a PLMN/RAT according to predetermined order until the UE successfully registers to a PLMN. In the manual PLMN selection mode, the UE shows a list of available PLMNs/RATs to the user. In the automatic PLMN selection mode and the manual PLMN selection mode, PLMNs/RATs may be listed, for example, in the following order.

A PLMN list in a Home PLMN (HPLMN) or a PLMN list in an Equivalent HPLMN (EHPLMN).
A PLMN list in a "User Controlled PLMN Selector with Access Technology."
A PLMN list in an "Operator Controlled PLMN Selector with Access Technology."
A PLMN list reported by the AS layer.
An MN list reported by the AS layer.

Meanwhile, when the UE 100 roams to another network and a PLMN/access technology combined list having a higher priority is present in a VPLMN or the HPLMN (if the EHPLMN list is absent or empty), the EHPLMN (in the presence of the EHPLMN list), the user controlled PLMN selector or the operator controlled PLMN selector, the UE 100 periodically searches for a PLMN to select a PLMN in order to obtain a service. In this case, when the UE 100 finds a PLMN having a higher priority than a currently serving PLMN, the UE stores the PLMN in the EPLMN list. A period of a PLMN search operation is determined based on a PLMN search period (T) stored in the USIM. The PLMN search period (T) may be in the range of 6 minutes to 8 hours in 6 minute steps. If no PLMN search period (T) is stored in the USIM, a default value of 60 minutes is used.

Meanwhile, the UE may set a value of a minimum periodic search timer (for example, MinimumPeriodicSearchTimer) through an NAS management object (MO), which is a minimum period on which a PLMN search needs to be performed. The UE sets the PLMN search period (T) that is not smaller than the value of the minimum periodic search timer (MinimumPeriodicSearchTimer). When the value stored in the USIM or the default value (if no value is stored in the USIM) is smaller than the value of the minimum periodic search timer (MinimumPeriodicSearchTimer), the PLMN search period (T) is set to the value of the minimum periodic search timer (MinimumPeriodicSearchTimer).

Meanwhile, the provider may operate PLMNs according to RATs. For example, Deutsche Telekom may operate PLMN A (LTE network, highest) and PLMN B (UMTS network, secondary). VZW may operate PLMN A (LTE network, highest) and PLMN B (CDMA network, secondary). In this case, the UE may access PLMN B (secondary) in the HPLMN to receive a service at one time, and subsequently access PLMN A (LTE network) via a periodic PLMN search. Thus, in this case, the UE may select a PLMN having a higher priority via a PLMN search even in the HPLMN according to network management by the provider.

Hereinafter, a problem caused by a disabled network is described with reference to FIG. 7.

As illustrated in FIG. 7, when the UE 100 is turned on, the UE 100 selects a PLMN which has been accessed previously. It is assumed that that the previously accessed PLMN is, for example, a PLMN#A. It is also assumed that the UE 100 receives and stores an access/location update timer (for example, a T3402 timer) from an MME#A 510*a* in the previously accessed PLMN#A.

Meanwhile, it is assumed that when the UE 100 is turned on, the MME#A 510 of the PLMN#A is disabled and the PLMN#B is normally operating.

The UE 100 transmits an attach request or TAU request to the MME#A 510*a* through an (e)NodeB#A 200*a* in the PLMN#A.

Subsequently, the UE 100 operates a response waiting timer, for example, a T3410/T3430 timer.

However, since the MME#A 100*a* is disabled, there is no response. That is, the UE 100 receives no response until the response waiting timer (T3410/T3430 timer) expires.

The UE 100 increases a counter by 1 and verifies whether a counter value is a threshold (th, for example, 5).

If the counter value is smaller than the threshold (th), the UE 100 operates a back-off timer (for example, a T3411 timer).

When the back-off timer (T3411 timer) expires, the UE 100 retransmits the attach request or TAU request.

If the counter value is the threshold (th, for example, 5), the UE 100 operates the. access/location update timer (T3402).

When the access/location update timer (T3402) expires, the UE 100 reselects a PLMN. The T3402 timer is a timer provided by an MME in an E-UTRAN/LTE service, which is set to 12 minutes by default.

As described above, although the MME is disabled, the UE does not recognize that the MME is disabled and thus repeatedly transmits the attach request or TAU request to the disabled MME until the counter value is the threshold (th, for example, 5) so that the UE is allowed to select a PLMN or to change an RAT. Thus, radio resources are wasted. Further, unnecessary signaling in the network is continually performed, causing deterioration in user experience.

Moreover, when a huge number of UEs are connected to the disabled MME, the foregoing problem becomes serious.

Figure 8:
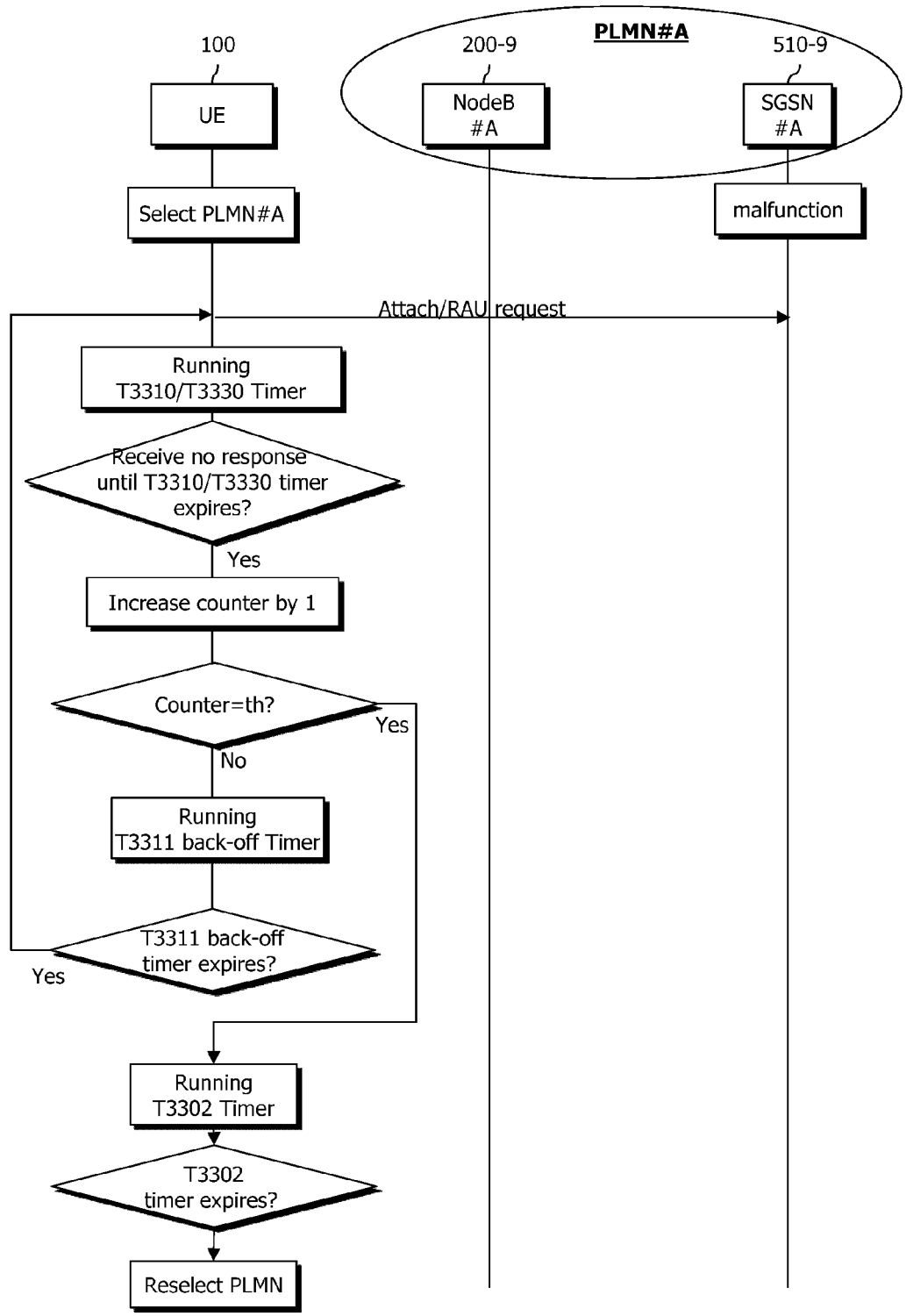
FIG. 8 illustrates a case where an attach request/RAU request continually fails when an SGSN is disabled.

FIG. 8 illustrates a case where an attach request/routing area update (RAU) request continually fails when a serving general packet radio service (GPRS) support node (SGSN) is disabled.

As illustrated in FIG. 8, when the UE 100 is turned on, the UE 100 selects a PLMN which has been accessed previously. It is assumed that that the previously accessed PLMN is, for example, the PLMN#A. It is also assumed that the UE 100 receives and stores an access/location update timer (for example, T3302 timer) from an SGSN#A 510-9 in the previously accessed PLMN#A.

Meanwhile, it is assumed that when the UE 100 is turned on, the SGSN#A 510-9 of the PLMN#A is disabled and the PLMN#B is normally operating.

The UE 100 transmits an attach request or RAU request to the SGSN#A 510-9 through a NodeB#A 200-9 in the PLMN#A.

Subsequently, the UE 100 operates a response waiting timer, for example, a T3310/T3330 timer.

However, since the SGSN#A 510-9 is disabled, there is no response. That is, the UE 100 receives no response until the response waiting timer (T3310/T3330 timer) expires.

The UE 100 increases a retransmission counter by 1 and verifies whether a retransmission counter value is a threshold (th, for example, 5).

If the retransmission counter value is smaller than the threshold (th), the UE 100 operates a back-off timer (for example, a T3311 timer).

When the back-off timer (T3311 timer) expires, the UE 100 retransmits the attach request or RAU request.

If the retransmission counter value is the threshold (th, for example, 5), the UE 100 operates the access/location update timer (T3302).

When the access/location update timer (T3302) expires, the UE 100 reselects a PLMN. The T3302 timer is a timer provided by an SGSN in an UTRAN/UMTS service, which is set to 12 minutes by default.

As described above, although the SGSN is disabled, the UE does not recognize that the SGSN is disabled and thus repeatedly transmits the attach request or RAU request to the disabled SGSN until the retransmission counter value is the threshold (th, for example, 5) so that the UE is allowed to select a PLMN or to change an RAT. Thus, radio resources are wasted. Further, unnecessary signaling in the network is continually performed, causing deterioration in user experience.

Figure 9:
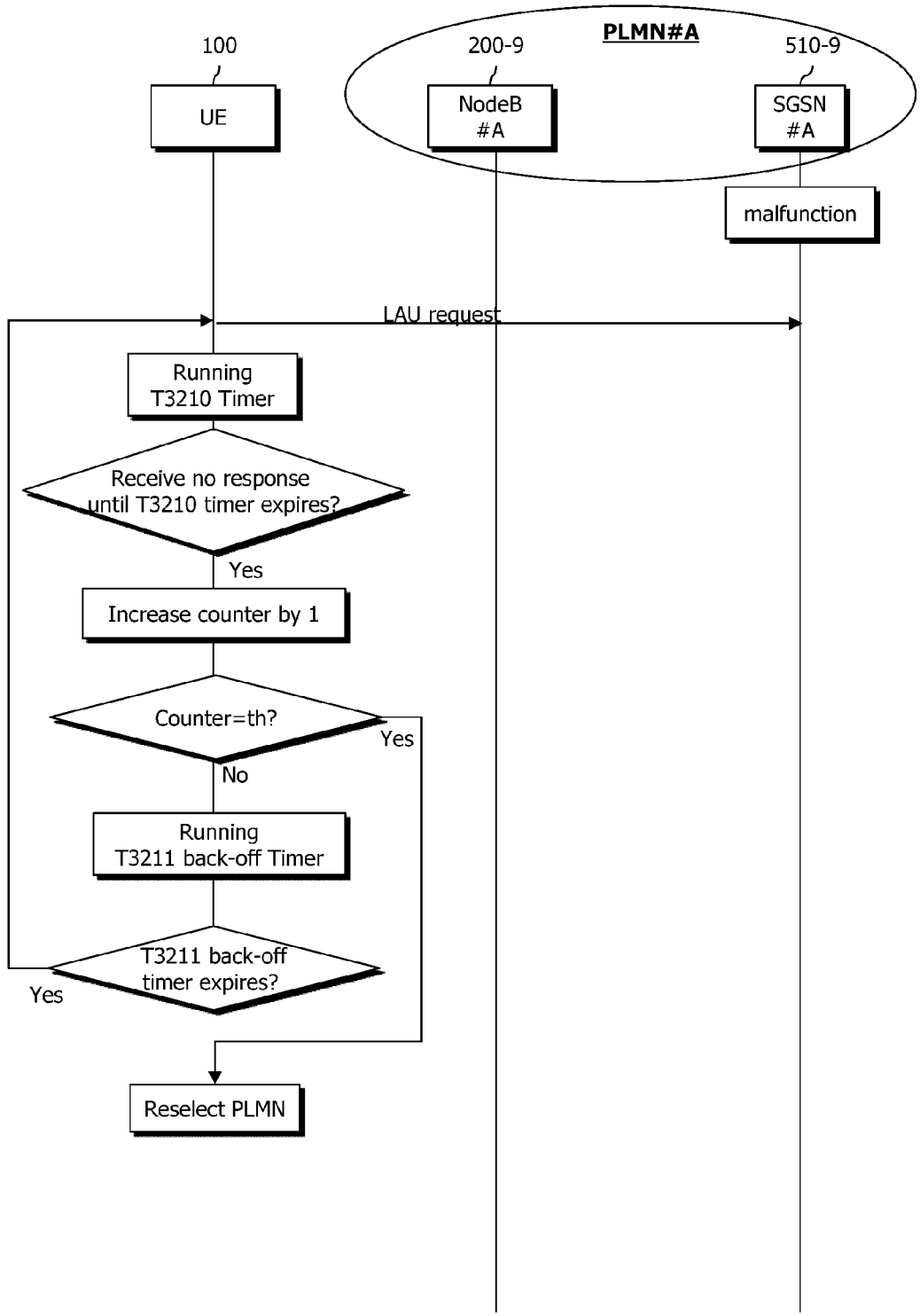
FIG. 9 illustrates a case where an LAU request continually fails when an SGSN is disabled.

FIG. 9 illustrates a case where a location area update (LAU) request continually fails when the SGSN is disabled.

As illustrated in FIG. 9, in a state where the SGSN#A 510-9 is disabled, the UE 100 transmits an LAU request message.

Subsequently, the UE 100 operates a T3210 timer. When the UE 100 receives no response until the timer expires, the UE 100 increases a retransmission counter by 1 and verifies whether a retransmission counter value is a threshold (th, for example, 4).

If the retransmission counter value is smaller than the threshold (th), the UE 100 operates a back-off timer (for example, a T3211 timer).

When the back-off timer (T3211 timer) expires, the UE 100 retransmits the LAU request message.

If the retransmission counter value is the threshold (th, for example, 4), the UE 100 reselects a PLMN.

As described above, although the SGSN is disabled, the UE does not recognize that the SGSN is disabled and thus repeatedly transmits the LAU request message to the disabled SGSN until the retransmission counter value is the threshold (th, for example, 4) so that the UE is allowed to select a PLMN or to change an RAT. Thus, radio resources are wasted. Further, unnecessary signaling in the network is continually performed, causing deterioration in user experience.

Figure 10:
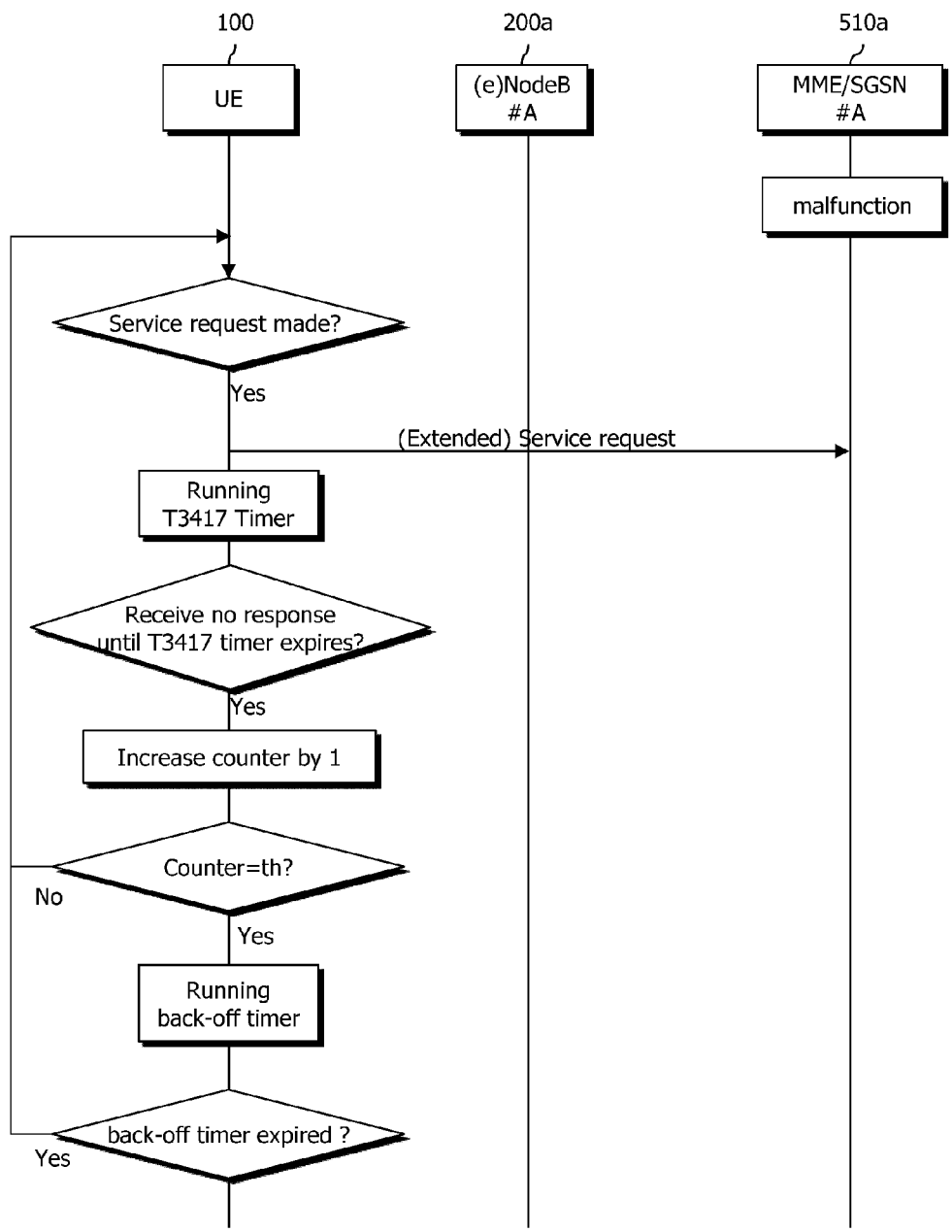
FIG. 10 illustrates a case where a service request procedure continually fails when an MME/SGSN is disabled.

FIG. 10 illustrates a case where a service request procedure continually fails when an MME/SGSN is disabled.

Before going to a description with reference to FIG. 10, a service request procedure and a service request timer are be described briefly.

The service request procedure is performed when the UE 100 switches from an EMM-idle state to an EMM-connected state or sets up a radio section and S1 bearer for transmitting user data or an NAS control signal. Further, the service request procedure is performed for a mobile originated (MO) or mobile terminated (MT) circuit switching (CS) fallback or 1xCS fallback procedure. The service request procedure is initiated by transmitting a service request message or extended service request message. The service request message is transmitted to set up a radio section and S1 bearer for transmitting user data or an NAS control signal. Meanwhile, the extended service request message is transmitted to perform an MO or MT CS fallback or 1xCS fallback procedure. Further, the extended service request message may be transmitted when a UE having a low priority sets up a radio section and S1 bearer for transmitting user data or an NAS control signal. In this case, a service type field is set to "packet services via S1" to be transmitted. When an indication that a bearer is completely set up is received from the AS layer or an indication that a system is changed is received in the case of a CS fallback, the UE recognizes that the service request procedure succeeded. When a service reject message is received from the network, the UE recognizes that the service request procedure failed.

After the UE 100 transmits the service request message or extended service request message, the NAS layer of the UE 100 operates a service request timer (for example, a T3417 timer or extended T3417 timer). The service request timer is used to recognize/determine whether the service request procedure succeeds or fails.

The T3417 timer or extended T3417 timer are default timers which are set to operate in the UE for E-UTRAN/LTE services and have default values of 5 seconds and 10 seconds by default, respectively. The T3417 timer operates when a service request message is transmitted, an extended service request message is transmitted to perform a 1xCS fall back, or a UE having a low priority transmits an extended service request message with a service type field set to "packet services via S1." The T3417 timer is stopped when an indication that a bearer is set up is received from the AS layer or a service reject message is received from the network. However, when the T3417 timer expires without receiving any response, the service request procedure stops. Meanwhile, the extended T3417 timer operates when an extended service request message is transmitted to perform an MO/MT CS fallback. The extended T3417 timer is stopped when an indication that a system change succeeded or failed is received from the AS layer or a service reject message is received from the network. However, when the extended T3417 timer expires without receiving any response, the service request procedure stops.

Hereinafter, a problem in a service request procedure caused by a disabled MEE/SGSN is described with reference to FIG. 10.

As illustrated in FIG. 10, when a service request is made in a state where an MME/SGSN#A 510a of the PLMN#A is disabled, the UE 100 transmits a service request or extended service request to the MME/SGSN#A 510a through an (e)NodeB 200a.

The UE 100 operates a service request timer (for example, the T3417 timer or extended T3417 timer).

When the UE 100 receives no response from the MME/SGSN#A 510a until the service request timer expires, the UE 100 increases a retransmission counter by 1 and verities whether a retransmission counter value is a threshold (th, for example, 5).

If the retransmission counter value is smaller than the threshold (th), the UE 100 retransmits the service request message.

If the retransmission counter value is the threshold (th, for example, 5), the UE 100 operates a back-off timer.

After the back-off timer expires, when a service request is made again by an application or the like in the UE 100, the UE 100 retransmits the service request but continually fails to transmit the service request.

As described above, although transmission of the service request message continually fails, the service request message is repeatedly and infinitely retransmitted without reselecting a PLMN or changing an RAT, unlike an attach request message/TAU request message/RAU request message/LAU request message.

Accordingly, the UE 10a experiences service interruption for a long time.

While the problem in the case of the disabled MME/SGSN has been described from a UE perspective, a problem from a network perspective will be described below with reference to FIG. 11.

Figure 11:
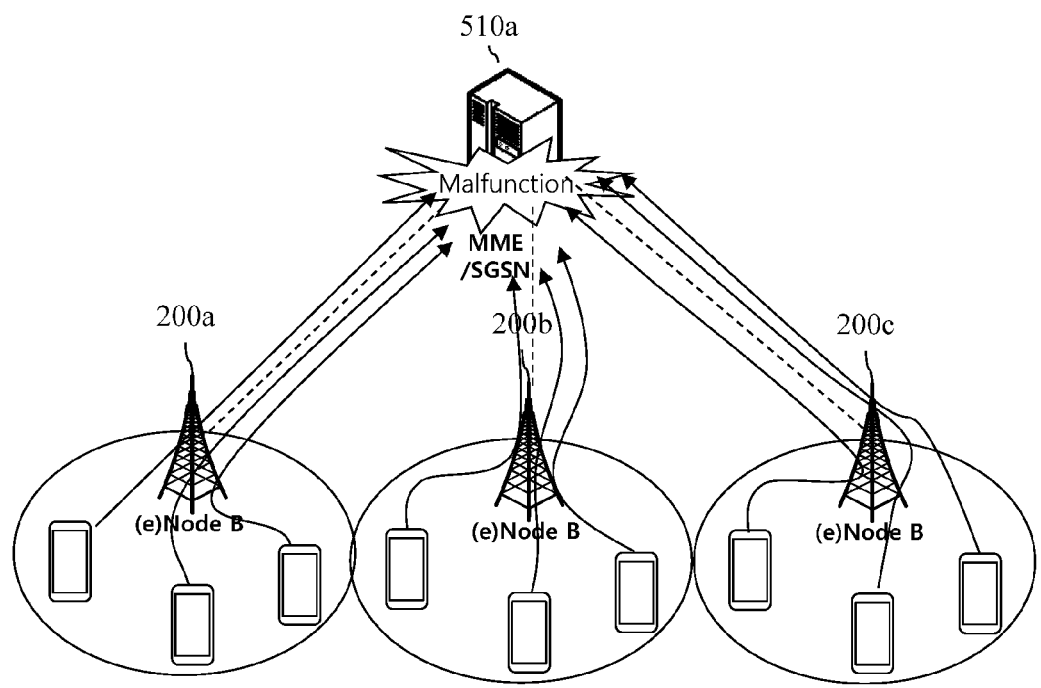
FIG. 11 illustrates an overloaded network due to repeated requests from a great number of UEs even in a disabled MME/SGSN.

FIG. 11 illustrates an overloaded network due to repeated requests from a great number of UEs even in a disabled MME/SGSN.

As illustrated in FIG. 11, although the MME/SGSN#A 510a is disabled, UEs do not recognize that the MME/SGSN#A 510a is disabled and thus repeatedly transmit an attach request message/TAU request message/RAU request message/LAU request message/service request message.

Repeated retransmissions may cause an overloaded network.

In particular, a service request message is infinitely retransmitted, thus aggravating network overload. To solve this problem, there have been attempts to restrict the maximum number of times a UE is allowed to retransmit a service request message for a particular period of time. However, such a solution is merely for an individual UE but is not a fundamental solution to the problem. That is, after the MME/SGSN#A 510a is disabled, since a great number of UEs repeatedly retransmit a request message up to the maximum number of times, the foregoing problem is not fundamentally solved.

Therefore, embodiments of the present invention disclose solutions to the foregoing problem.

BRIEF DESCRIPTION OF EMBODIMENTS OF THE PRESENT INVENTION

One embodiment of the present invention prevents a UE from infinitely retransmitting an NAS request message (for example, an attach request message/TAU request message/RAU request message/LAU request message/service request message) when an MME/SGSN is disabled, thereby saving network resources and improving user experience.

In particular, the foregoing problem occurs since a UE does not recognize that the MME/SGSN is disabled. Thus, one embodiment of the present invention is to provide a method enabling the UE to effectively recognize that the MME/SGSN is disabled.

Hereinafter, embodiments of the present invention will be described with reference to FIGS. 12 to 14.

Figure 12:
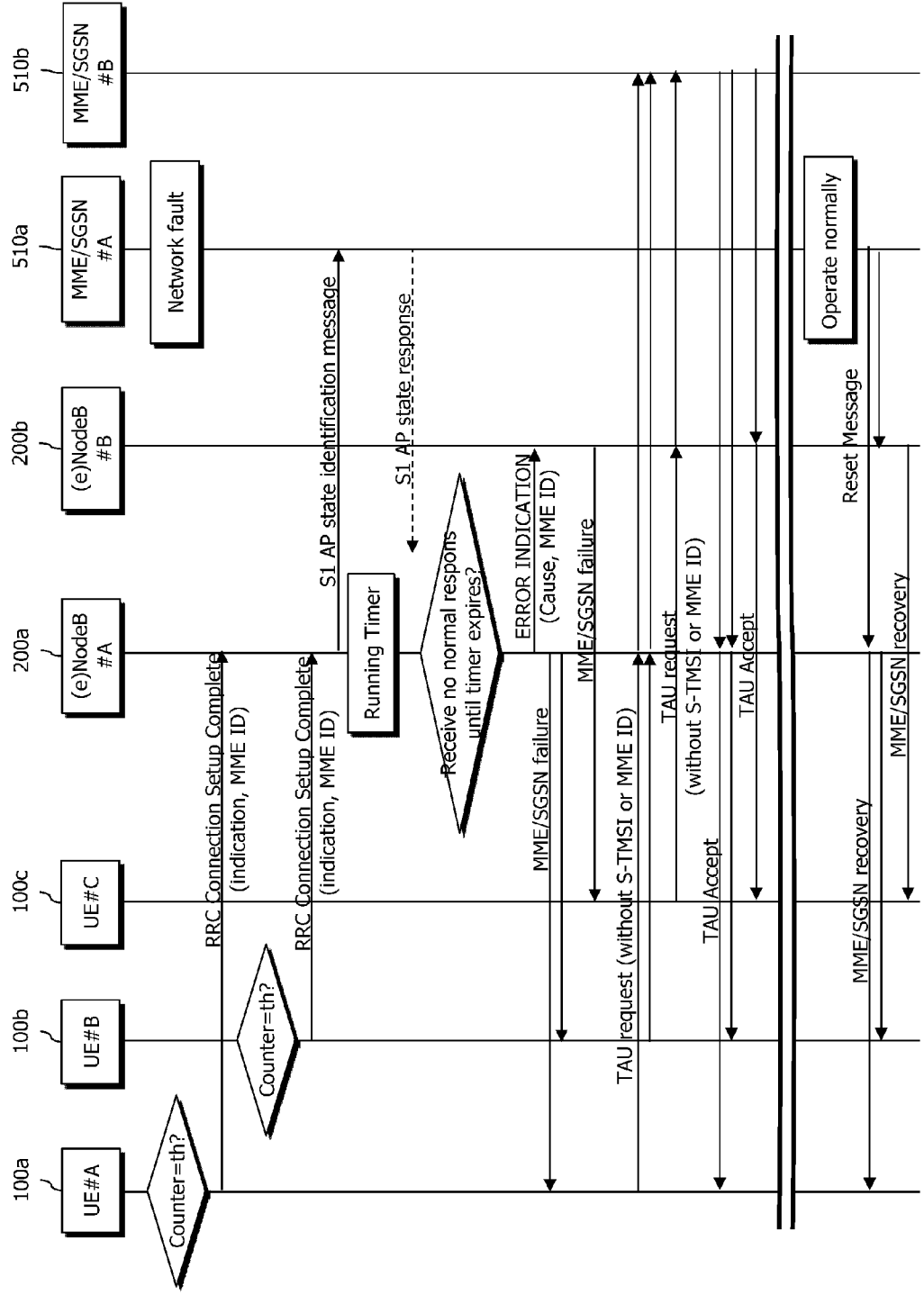
FIG. 12 is a flowchart illustrating a scheme in the case of a disabled MME/SGSN according to a first embodiment of the present invention.

FIG. 12 is a flowchart illustrating a scheme in the case of a disabled MME/SGSN according to a first embodiment of the present invention.

According to the first embodiment of the present invention illustrated in FIG. 12, when a retransmission counter of a UE#A 100a has the same value as a threshold, the UE 100a notifies an (e)NodeB#A 200a that there is no response from an MME/SGSN#A 510a, and the (e)NodeB#A 200a verifies whether the MME/SGSN#A 510a is disabled. When the (e)NodeB#A 200a verifies that the MME/SGSN#A 510a is disabled, the (e)NodeB#A 200a notifies the UE, other UEs, and a neighboring (e)NodeB#B 200b that the MME/SGSN#A 510a is disabled. Accordingly, the UE may reselect an MME/SGSN#B 510b.

A detailed description is made below with reference to FIG. 12.

1) When the retransmission counter with respect to an NAS request message (for example, an attach request message/TAU request message/RAU request message/LAU request message/service request message) has the same value as the threshold (th), the UE#A 100#a transmits an AS message, which includes an indication that there is no response from the MME/SGSN#A 510a, to the (e)NodeB#A200a. The indication is included in the AS message, not in an NAS message, because the NAS message cannot be read by the (e)NodeB#A 200a and is passed directly to the MME/SGSN#A 510a whereas the AS message can be read by the (e)NodeB#A 200a. The AS message including the indication may be, for example, a RRC connection setup complete message or new message. The indication may be included alone in the RRC connection setup complete message or be included along with the NAS request message in the RRC connection setup complete message. Further, information on a registered MME (for example, MME ID) may also be included in the RRC connection setup complete message. Likewise, when the indication is included in the new AS message, the information on the registered MME (MME ID) may be further included therein.

2) Similarly, when the retransmission counter has the same value as the threshold (th), a UE#B 100#b also transmits an AS message, which includes an indication that there is no response from the MME/SGSN#A 510a, to the (e)NodeB#A 200a.

3) When the (e)NodeB#A 200a receives the AS message (for example, the RRC connection setup complete message) including the indication a predetermined number (M) of times, the (e)NodeB#A 200a identifies the MME/SGSN#A 510a through the information on the registered MME (for example, MME ID). Then, the (e)NodeB#A 200a transmits, to the MME/SGSN#A 510a, an S1 AP-based state identification message to verify whether the MME/SGSN#A 510a is in the disabled state or normal state. The state identification message may include an ID of the (e)NodeB#A 200a. After transmitting the state identification message, the (e)NodeB#A 200a operates a timer.

4) When the MME/SGSN#A 510a is not disabled and thus can receive the state identification message, the MME/SGSN#A 510a transmits a state response message which includes a cause indicating a state of the MME/SGSN#A 510a. However, when the MME/SGSN#A 510a is disabled, the MME/SGSN#A 510a cannot receive the state identification message and transmits no state response message.

5) When the (e)NodeB#A 200a receives no state identification message from the MME/SGSN#A 510a until the timer expires, the (e)NodeB#A 200a determines that the MME/SGSN#A 510a is disabled.

6) When the MME/SGSN#A 510a is determined to be disabled, the (e)NodeB#A 200a transmits a message indicating that the MME/SGSN#A 510a is disabled to a neighboring (e)NodeB#B 200b. The message may be, for example, an error indication message, which may include an ID of the MME/SGSN#A 510a and an indication that the MME/SGSN#A 510a is disabled. The neighboring (e)NodeB#B 200b receiving the message also transmits the message to a neighboring (e)NodeB.

7) Meanwhile, the (e)NodeB#A 200a notifies not only the UE#A 100a but also another UE, for example, the UE#B 100b, that the MME/SGSN#A 510a is disabled. Likewise, the neighboring (e)NodeB#B 200b also notifies a UE#C 100c that the MME/SGSN#A 510a is disabled. The disabled state may be notified, being included in system information, for example, a system information block (SIB), in a broadcast manner. It is notified in the broadcast manner that the MME/SGSN#A 510a is disabled in order to prevent not only the UE#A 100a retransmitting the NAS request message a threshold number of times but also another UE, for example, the UE#B 100b, from retransmitting the NAS request message. Thus, all UEs which have accessed the MME/SGSN#A 510a are prevented from repeating retransmissions, thus avoiding waste of network signaling.

8) When the UE#A 100a recognizes that the MME/SGSN#A 510a is disabled, the UE#A 100a transmits, to the (e)NodeB#A 200a, a TAU request message including no SAE-temporary mobile subscriber identity (S-TMSI) or no registered MME information (for example, MME ID) or an RAU request message including no packet-temporary mobile subscriber identity (P-TMSI).

9) Then, the (e)NodeB#A 200a performs an MME/SGSN reselection procedure to select an MME/SGSN#B 510b in the normal state and transmits a TAU request message or RAU request message to the selected MME/SGSN#B 510b.

10) The MME/SGSN#B 510b in the normal state transmits a TAU accept message or RAU accept message to the UE#A 100a through the (e)NodeB#A 200a. The accept messages may include a GUTI/P-TMSI allocated by the MME/SGSN#B 510b to the UE#A 100a. Then, in subsequently transmitting an NAS request message, when the UE 100 transmits the NAS request message including the allocated GUTI/P-TMSI to the (e)NodeB#A 200a, the (e)NodeB#A 200a may transmit the NAS request message to the MME/SGSN#B 510b in the normal state which allocates the GUTI/P-TMSI, not to the disabled MME/SGSN#A 510a.

11) Meanwhile, when the MME/SGSN#A 510a is recovered from the disabled state to the normal state, the MME/SGSN#A 510a transmits a reset message to the (e)NodeB#A 200a and (e)NodeB#B 200b.

12) Then, the (e)NodeB#A 200a and (e)NodeB#B 200b transmit an indication that the MME/SGSN#A 510a is recovered to the normal state to UEs through an SIB.

Figure 13:
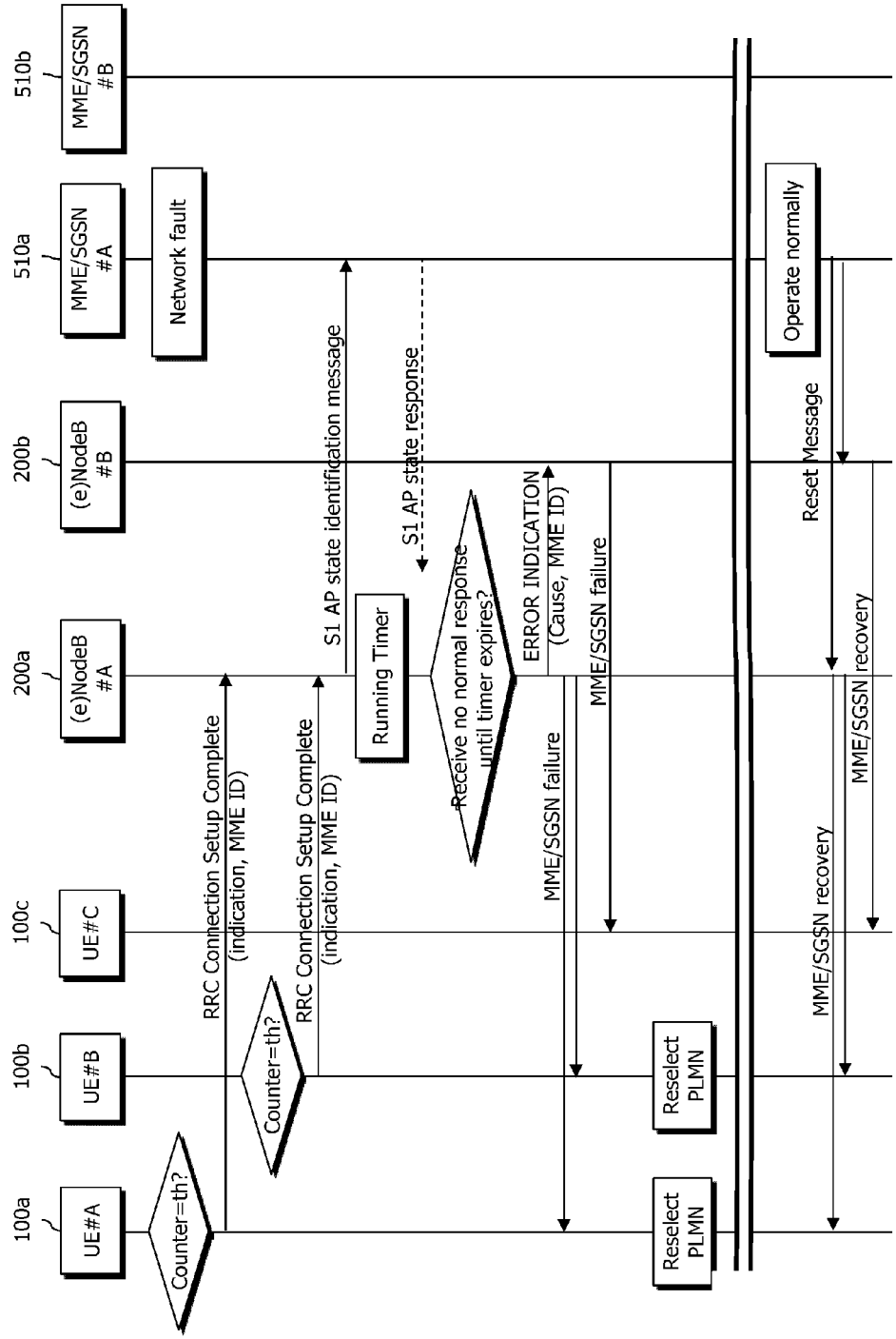
FIG. 13 is a flowchart illustrating a scheme in the case of a disabled MME/SGSN according to a second embodiment of the present invention.

FIG. 13 is a flowchart illustrating a scheme in the case of a disabled MME/SGSN according to a second embodiment of the present invention.

According to the second embodiment of the present invention illustrated in FIG. 13, when a retransmission counter of a UE#A 100a has the same value as a threshold, the UE#A 100a notifies an (e)NodeB#A 200a that there is no response from an MME/SGSN#A 510a, and the (e)NodeB#A 200a verifies whether the MME/SGSN#A 510a is disabled. When the (e)NodeB#A 200a verifies that the MME/SGSN#A 510a is disabled, the (e)NodeB#A 200a notifies the UE, other UEs, and a neighboring (e)NodeB#B 200b that the MME/SGSN#A 510a is disabled. Then, the UE#A 100a performs a PLMN reselection procedure. That is, according to the second embodiment of the present invention illustrated in FIG. 13, the UE#A 100a changes an RAT or reselects a PLMN, instead of performing a TAU/RAU procedure as in the first embodiment of FIG. 12.

In descriptions of the second embodiment, only different features from those of the first embodiment illustrated in FIG. 12 will be described hereinafter.

Operations 1 to 7 are the same as those in FIG. 12, and thus descriptions thereof are be omitted.

8) When the UE#A 100a recognizes that the MME/SGSN#A 510a is disabled, the
UE#A 100a performs a PLMN reselection procedure or RAT change procedure and accordingly transmits an attach request/TAU request/RAU request/LAU request/service request to the MME/SGSN#B 510b in the normal state.

9) When the MME/SGSN#A 510a is recovered from the disabled state to the normal state, the MME/SGSN#A 510a transmits a reset message to the (e)NodeB#A 200a and (e)NodeB#B 200b.

10) Then, the (e)NodeB#A 200a and (e)NodeB#B 200b transmit an indication that the MME/SGSN#A 510a is recovered to the normal state to UEs through an SIB.

Figure 14:
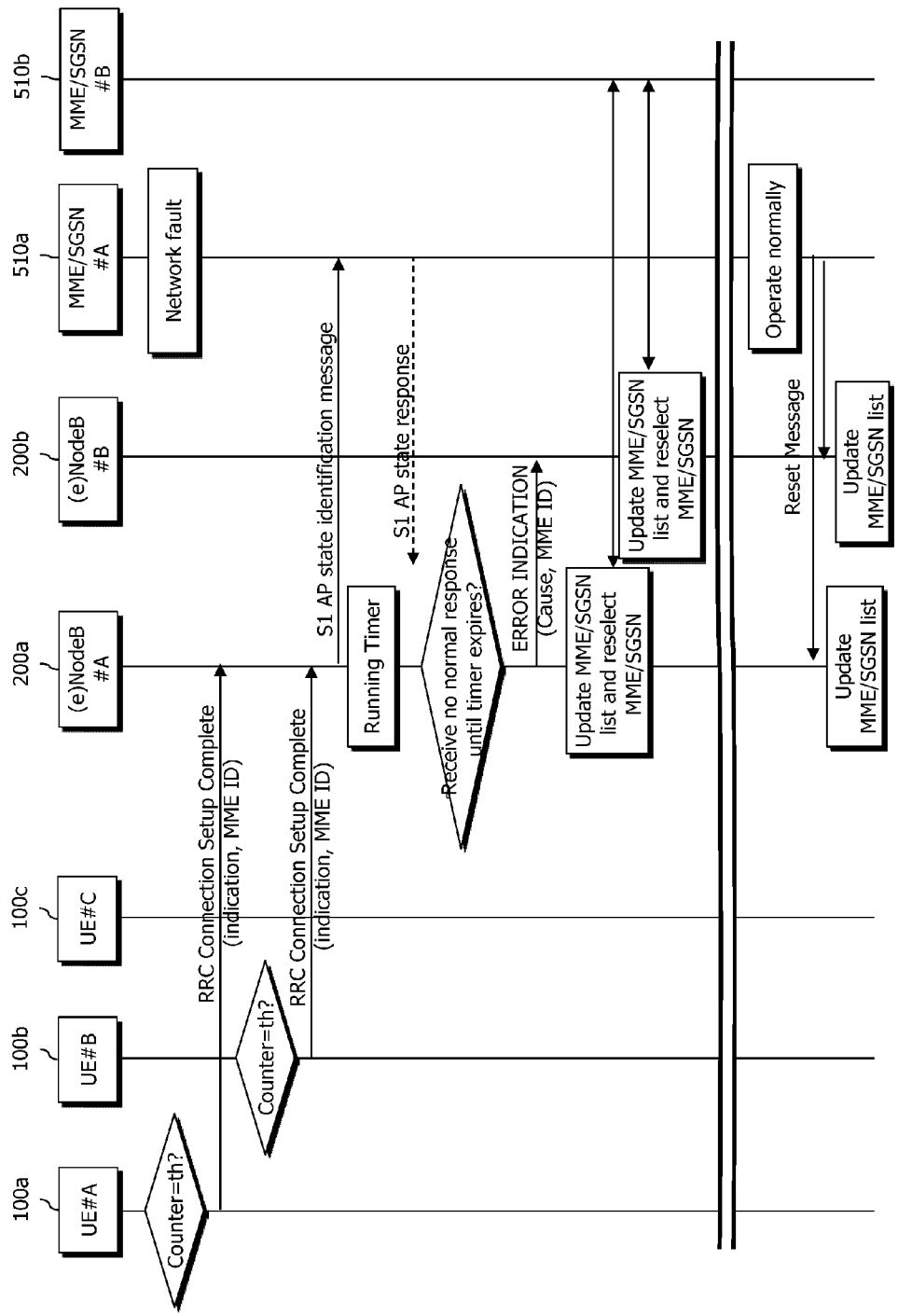
FIG. 14 is a flowchart illustrating a scheme in the case of a disabled MME/SGSN according to a third embodiment of the present invention.

FIG. 14 is a flowchart illustrating a scheme in the case of a disabled MME/SGSN according to a third embodiment of the present invention.

According to the third embodiment of the present invention illustrated in FIG. 14, when a retransmission counter of a UE#A 100a has the same value as a threshold, the UE#A 100a notifies an (e)NodeB#A 200a that there is no response from an MME/SGSN#A 510a, and the (e)NodeB#A 200a verifies whether the MME/SGSN#A 510a is disabled. When the (e)NodeB#A 200a verifies that the MME/SGSN#A 510a is disabled, the (e)NodeB#A 200a notifies a neighboring (e)NodeB#B 200b that the MME/SGSN#A 510a is disabled. Subsequently, the (e)NodeB#A 200a deletes information on the disabled MME/SGSN#A 510a from an MME/SGSN list and performs an MME/SGSN reselection procedure. Likewise, (e)NodeBs notified that the MME/SGSN#A 510a is disabled (for example, the (e)NodeB#B 200b) also delete the information on the disabled MME/SGSN#A 510a from the MME/SGSN list and perform the MME/SGSN reselection procedure.

Here, it is noticeable that the first embodiment in FIG. 12 allows a UE to reselect an MME/SGSN while the third embodiment in FIG. 13 allows an eNodeB to reselect an MME/SGSN.

In descriptions of the third embodiment, only different features from those of the first embodiment illustrated in FIG. 12 will be described hereinafter.

Operations 1 to 5 are the same as those in FIG. 12, and thus descriptions thereof are be omitted.

6) When the MME/SGSN#A 510a is determined to be disabled, the (e)NodeB#A 200a transmits a message indicating that the MME/SGSN#A 510a is disabled to the neighboring (e)NodeB#B 200b. The message may be, for example, an error indication message.

7) The (e)NodeB#A 200a deletes the information on the disabled MME/SGSN#A 510a from the available MME/SGSN list and performs the MME/SGSN reselection procedure to select an MME/SGSN#B 510B. Likewise, (e)NodeBs notified that the MME/SGSN#A 510a is disabled (for example, the (e)NodeB#B 200b) also delete the information on the disabled MME/SGSN#A 510a from the available MME/SGSN list and perform the MME/SGSN reselection procedure to select the MME/SGSN#B 510B.

The (e)NodeB#A 200a stores the disabled MME/SGSN#A 510a and the reselected MME/SGSN#B 5108 in the normal state in a mapping table. Thus, when the (e)NodeB#A 200a receives an NAS request message directed to the disabled MME/SGSN#A 510a from the UE#A 100a, the (e)NodeB#A 200a forwards the NAS request message to the reselected MME/SGSN#B 510E using the mapping table. Likewise, when the (e)NodeBs notified that the MME/SGSN#A 510a is disabled (for example, the (e)NodeB#B 200b) receive an NAS request message directed to the disabled MME/SGSN#A 510a from a UE, the (e)NodeBs also forward the NAS request message to the reselected MME/SGSN#B 510B using the mapping table.

9) When the MME/SGSN#A 510a is recovered from the disabled state to the normal state, the MME/SGSN#A 510a transmits a reset message to the (e)NodeB#A 200a and (e)NodeB#B 200b. The (e)NodeB#A 200a and (e)NodeB#B 200b receiving the reset message deletes the MME/SGSN#A 510a and MME/SGSN#B 510B from the mapping table. The (e)NodeB#A 200a includes the recovered MME/SGSN#A 510a in the available MME/SGSN list. Likewise, the (e)NodeBs notified that the MME/SGSN#A 510a is disabled (for example, the (e)NodeB#B 200b) also include the recovered MME/SGSN#A 510a in the available MME/SGSN list.

The contents described so far may be implemented in hardware. Such an implementation is described with reference to FIG. 15.

Figure 15:
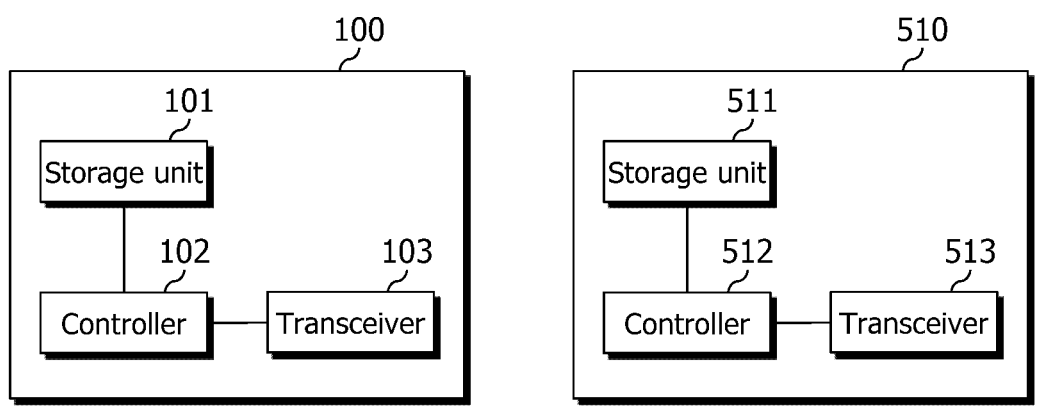
FIG. 15 is a block diagram of a UE 100 and an MME according to an embodiment of the present invention.

FIG. 15 is a block diagram of the UE 100 and the MME 510 according to an embodiment of the present invention.

As shown FIG. 15, the UE 100 includes memory means 101, a controller 102, and a transceiver unit 103. Furthermore, the MME 510 includes memory means 511, a controller 512, and a transceiver unit 513.

The memory means (101, 511) stores the above-explained methods.

The controller (102, 512) controls the memory means (101, 511) and the transceiver unit (103, 513). To be concrete, the controller (102, 512) executes the methods stored in the memory means (101, 511). Furthermore, the controller (102, 512) sends the aforementioned signals through the transceiver unit (103, 513).

Although the preferred embodiments of the present invention have been illustratively described, the scope of the present invention is not limited to only the specific embodiments, and the present invention can be modified, changed, or improved in various forms within the spirit of the present invention and within a category written in the claims.

What is claimed is:

1. A method of a user equipment (UE) reselecting a network node in charge of a control plane, the method comprising:
   retransmitting, by the UE, a non-access stratum (NAS) request message when the UE transmits the NAS request message to a network node in charge of the control plane through a base station but receives no response message;
   transmitting, by the UE, an access stratum (AS) message, which includes an indication showing no response from the network node, to the base station when retransmission of the NAS request message is repeated a preset number of times or more; and
   reselecting another network node in charge of the control plane instead of the network node in a disabled state when information indicating that the network node is in the disabled state is received from the base station.

2. The method of claim 1, wherein the network node in charge of the control plane is a mobility management entity (MME) or serving general packet radio service support node (SGSN).

3. The method of claim 1, wherein the NAS request message comprises at least one of an attach request message, a tracking area update (TAU) request message, a routing area update (RAU) request message, a location are update (LAU) request message and a service request message.

4. The method of claim 1, further comprising transmitting a TAU request message or RAU request message to the selected other node.

5. The method of claim 4, wherein when the TAU request message is transmitted, the TAU request message does not comprise at least one of an SAE-temporary mobile subscriber identity (S-TMSI) and an ID of the MME, and when the RAU request message is transmitted, the RAU request message comprises no packet-temporary mobile subscriber identity (P-TMSI).

6. The method of claim 1, wherein the information indicating that the network node is in the disabled state is broadcast from the base station.

7. The method of claim 6, wherein the information indicating that the network node is in the disabled state is received via system information broadcast from the base station.

8. The method of claim 1, further comprising receiving information indicating that the network node is recovered from the base station in a broadcast manner when the network node is recovered from the disabled state to a normal state.

9. A method of a base station reselecting a network node in charge of a control plane, the method comprising:
   receiving an access stratum (AS) message, which includes an indication showing no response from the network node, from a user equipment (UE) retransmitting a non-access stratum (NAS) request message a number of times;
   transmitting a state identification request message to the network node in response to the received message;
   notifying another base station or the UE that the network node is in a disabled state when a response message to the state identification request message is not received; and
   reselecting another network node in charge of the control plane for the UE.

10. The method of claim 9, wherein the network node in charge of the control plane is a mobility management entity (MME) or serving general packet radio service support node (SGSN).

11. The method of claim 9, wherein the NAS request message comprises at least one of an attach request message, a tracking area update (TAU) request message, a routing area update (RAU) request message, a location area update (LAU) request message and a service request message.

12. The method of claim 9, wherein the notifying the UE that the network node is in the disabled state comprises broadcasting system information which comprises information indicating that the network node is in the disabled state.

13. The method of claim 9, further comprising broadcasting information indicating that the network node is recovered when the network node is recovered from the disabled state to a normal state.

14. The method of claim 9, further comprising updating a network node list such that the network node is in the disabled state.

15. The method of claim 14, wherein the updating comprises mapping the network node in the disable state and the reselected other network node in the list.

* * * * *